Aug. 13, 1968     E. L. ECKSTEIN     3,396,931
WEIGHT-BALANCED ADJUSTABLE RADIATION APPARATUS
Filed July 21, 1965     3 Sheets-Sheet 1
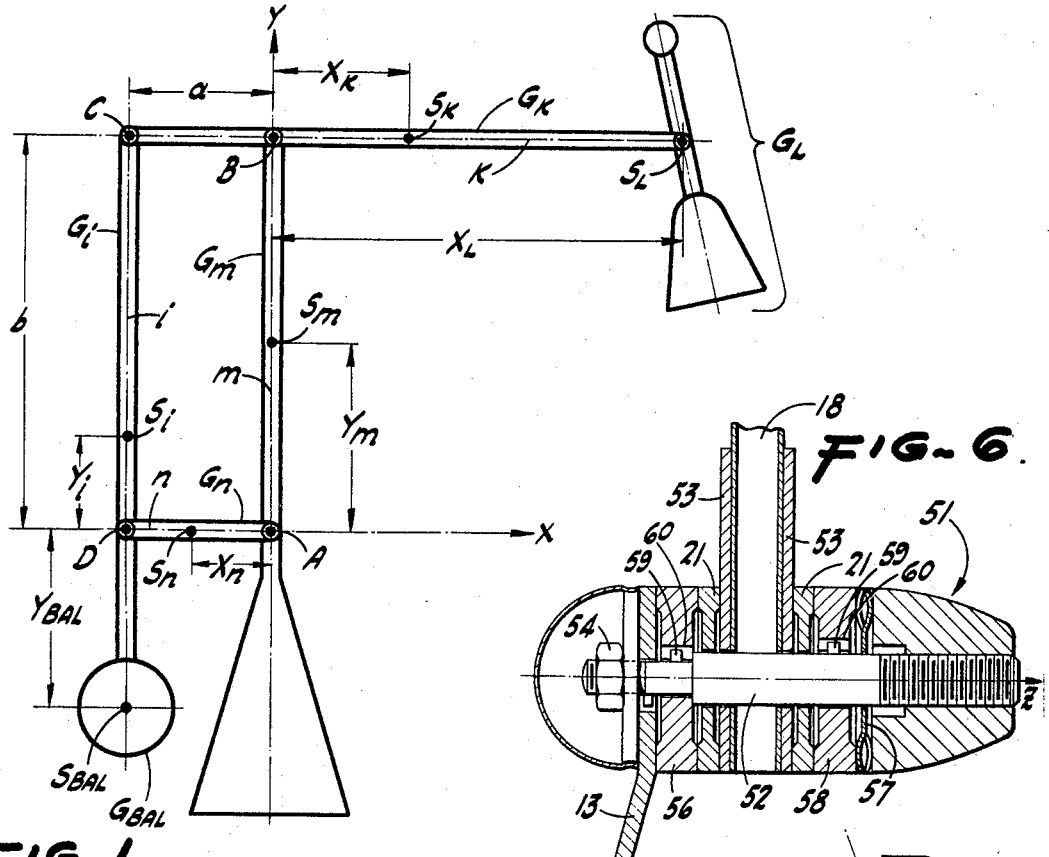
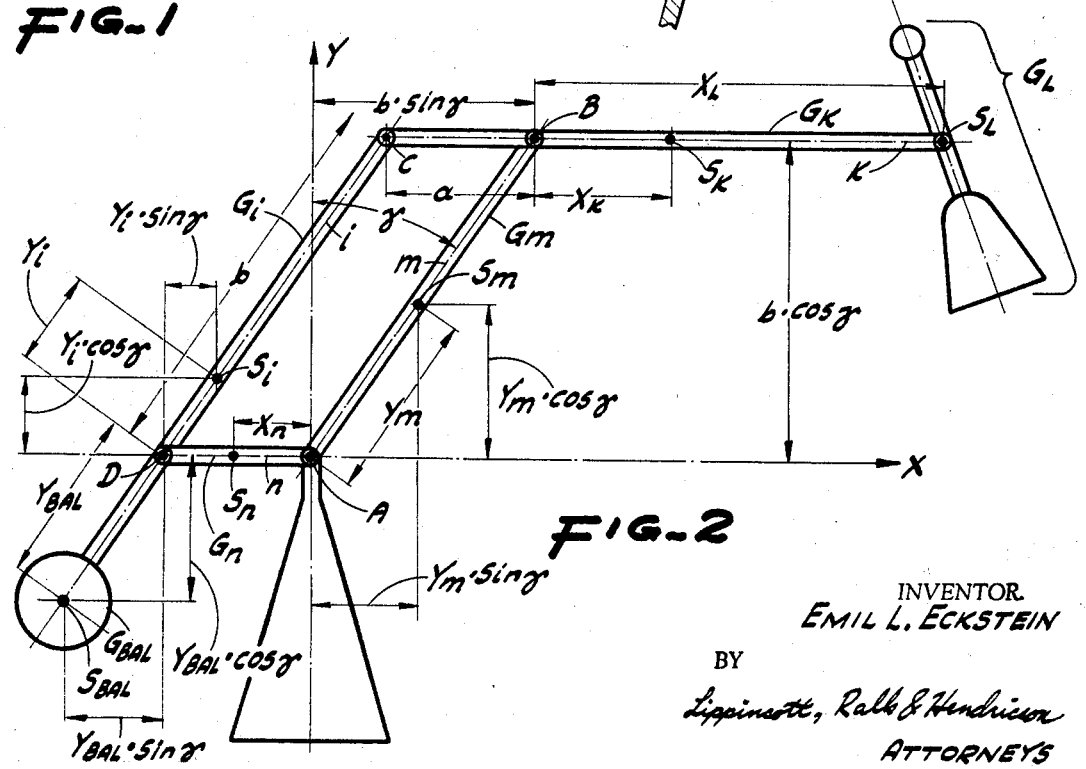
INVENTOR.
EMIL L. ECKSTEIN
BY Lippincott, Ralh & Hendricson
ATTORNEYS Aug. 13, 1968  E. L. ECKSTEIN  3,396,931
WEIGHT-BALANCED ADJUSTABLE RADIATION APPARATUS
Filed July 21, 1965  3 Sheets-Sheet 2
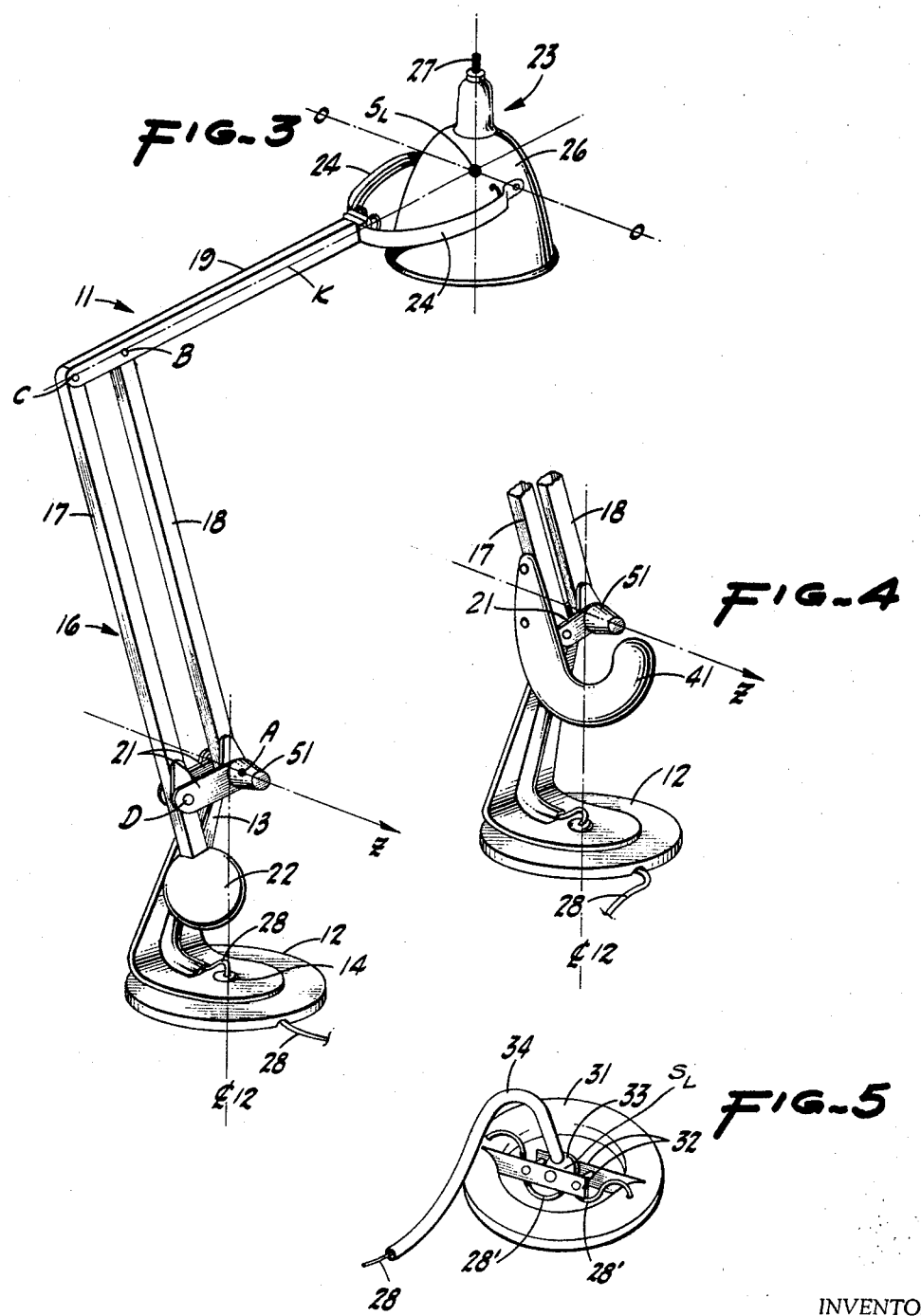
INVENTOR.
EMIL L. ECKSTEIN
BY
Lippincott, Palle & Hendrickson
ATTORNEYS

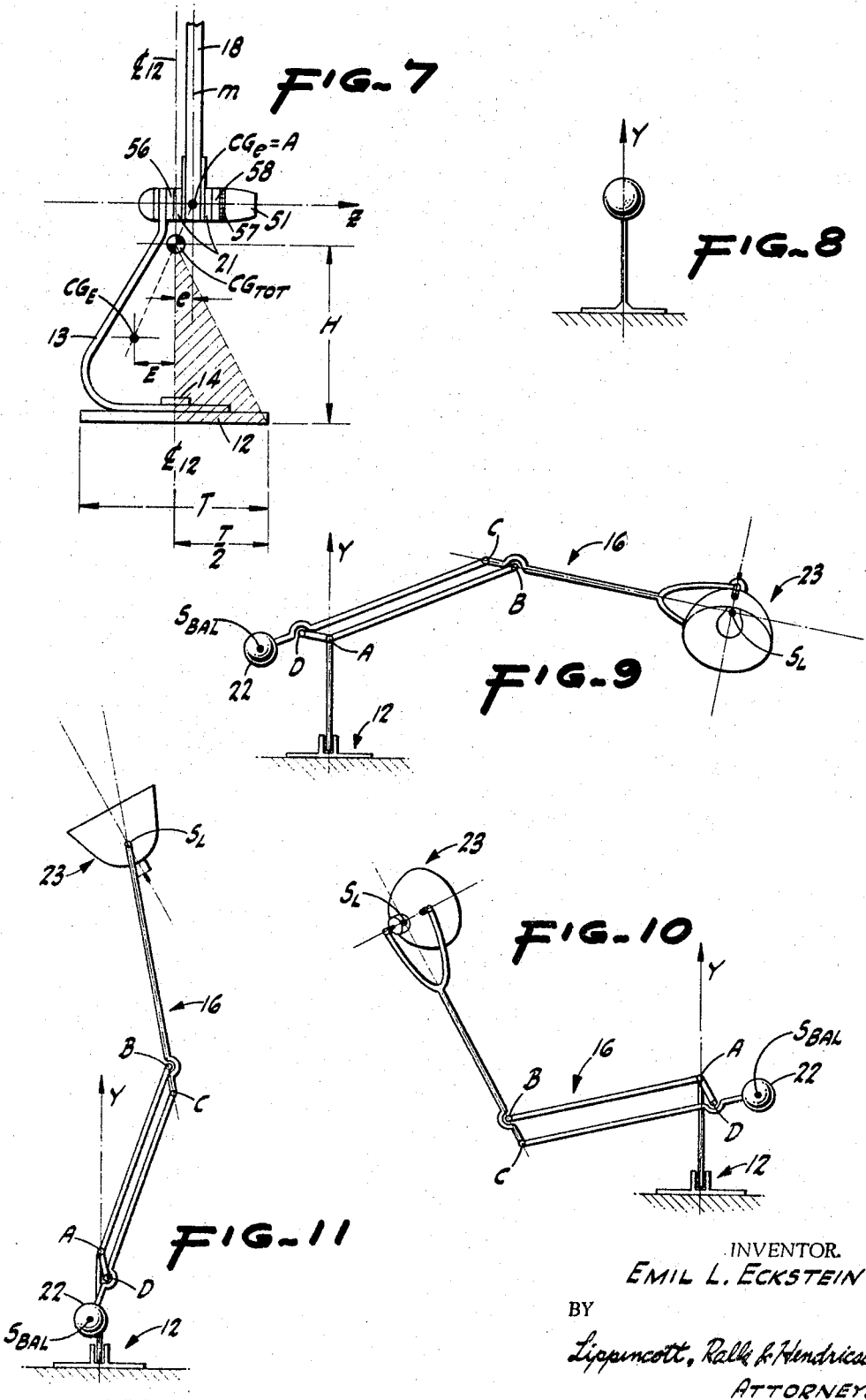

United States Patent Office 3,396,931
Patented Aug. 13, 1968

3,396,931
**WEIGHT-BALANCED ADJUSTABLE
RADIATION APPARATUS**
Emil L. Eckstein, 27002 Whitestone Road,
Palos Verdes Peninsula, Calif. 90274
Filed July 21, 1965, Ser. No. 473,604
8 Claims. (Cl. 248—280)

The present invention relates in general to radiation apparatus having balanced adjustable mounting in which the active or passive radiation device thereof may be positioned as desired, while maintaining the entire apparatus in balance at all times. More specifically, the invention relates to a parallelogram linkage system having a balancing weight and carrying any type of radiation device.

In the following description of the present invention, the term "radiation" or "radiation device" is applied to define all types of radiation whether it be in waveform or of corpuscular nature, and any type of device wherein the receipt or transmittal of radiation insofar as classical non-relativistic mechanics is concerned, does not change the mass or center of gravity location of the device. Such radiation may either be emitted or received, with the sole limitation being as set forth above that the radiation does not substantially change the mass of the device nor exert any impinging or reactive force onto the same, insofar as classical, non-relativistic mechanics are concerned. Thus, the radiation device as contemplated by the present invention might include X-ray lamps, atomic radiation sources, mirrors, sun ray collectors, lasers, telescopes, ultrasonic sources, microphones, loudspeakers, optical and TV cameras, or any other type of apparatus for use in electromagnetic radiation, including light, heat, radio waves, acoustical radiation, atomic radiation, or the like. An illuminating lamp is probably one of the best known and widely employed radiation devices and, consequently, the following description of the present invention is referenced to an adjustable illuminating lamp.

For the purpose of a complete and precise disclosure, there are herein employed certain terms as defined below.

Lamp: actual illuminating element, herein mounted upon a link of the parallelogram linkage;
Lamp Apparatus: "balanced system" consisting of parallelogram linkage, balancing weight and lamp, plus "support system" consisting of all foot items;
Balance: neutral equilibrium of the balanced system in all parallelogram positions;
Stability: stable equilibrium of the entire lamp apparatus with same disposed upon a surface such as a table top. The degree of stability is dependent upon the diameter of the base, the height of the center of gravity above the surface and the weight of the lamp apparatus.

Many applications of radiation apparatus, such as lamp-apparatus, require the ready placement of the radition device or lamp thereof in particular positions, and it is preferable that this be capable of accomplishment with a minimum of effort and also with a maximum degree of stability of the apparatus. Any adjustably movable lamp support should remain in any adjusted position without danger of collapse. Furthermore, the lamp itself should remain in adjusted position until intentionally moved therefrom. The amount of effort involved in operating an adjustable system for a radiation device such as a lamp, should be kept at a minimum, and it should be possible, also with a minimum of effort, to freeze the entire system in adjusted position. In order to attain portability, it is likewise desirable for the entire apparatus to have a minimum weight, and preferably to require no rigid connection to other stable members, i.e., to have adequate constant static stability when freely standing on a table or the like. A further desirable feature of this apparatus is the presentation of an attractive appearance, and for shop or field use extremely large lamp movements should be possible.

Considerable effort has been expended in the past in the development of adjustable systems for radiation devices, and a relatively large number of adjustable systems have been developed. It has long been recognized that linkages with friction joints or spring-loaded adjusting linkages cannot fully provide the above-noted features, and thus there have been developed a variety of weight-balanced systems in which an offset weight is employed for the purpose of balancing the weight of a lamp or the like. Of these prior art approaches, those employing simple lever systems are inadequate in providing only a very limited adjustment range, or in having excessive weight. More specifically, the prior art shows a weight-balanced lamp with a parallelogram linkage as the adjusting means, a balancing weight on one link of a parallelogram, and the radiation source, such as the lamp shade and bulb, on a parallel link of the parallelogram. In this type of lamp-apparatus, the total center of gravity of the movable system must be on one of the two parallelogram sides between two of the four parallelogram joints. This type of lamp-apparatus is normally bulky and complicated, as well as requiring a fifth joint, namely, a very strongly built supporting joint. One or more of the parallelogram members must have forked-shaped terminations to avoid interference with other of the lamp-apparatus parts, or two separate weights must be disposed outside of the system plane. This type of prior art lamp-apparatus which has been constructed and marketed requires two operations for fixing the movable system in any adjusted position, inasmuch as the supporting joint must be clamped and also one of the four parallelogram joints must be clamped.

Despite the extensive efforts which have in the past been expended to perfect weight-balanced adjustable lamp-apparatus, there has not even been suggested the particular structure which does afford the necessary and desirable features thereof provided by the present invention. General suggestions for the use of a pantograph with a balanced weight on one end and a lamp on the other, do not solve the problems inherent in this type of system. Such a system, disposing the balancing weight, lamp, and supporting point on a single straight line, neglects the effect of the parallelogram linkage weights. In actual practice, all adjustable radiation devices of the general type discussed above require the placement of the supporting point outside of a line passing through the individual centers of gravity of the weight and lamp. Certain suggestions for overcoming this difficulty have been made to the effect that a single torque moment equation must be satisfied to cancel out the lamp moment and linkage moment. This suggestion is not adequate to cure the limitations of other prior art teachings, for actual construction of such a lamp would result in an unbalance and collapse of the movable lamp system in many adjusted positions.

The present invention provides a specific relationship of elements in terms of weights thereof and centers of gravity, so that a wide variety of adjustable radiation devices constructed in accordance with this teaching will provide the requisite adjustability with constant neutral equilibrium. In accordance with the present invention, there is provide a weight-balanced, adjustable radiation apparatus including but a single balancing weight, and supported at one of the four joints of a movable parallelogram linkage carrying a radiation device upon the extension of one arm thereof. The apparatus hereof also provides for freezing the linkage in any adjusted position. The invention hereof is described below in connection with a weight-balanced, adjustable lamp-apparatus. However, it is not intended to limit the present invention to the precise terms of the following description or the details of the accompanying illustrations. The invention may be best understood from a consideration of the following description taken in connection with the accompanying drawings, wherein:

FIGURE 1 is a schematic elevational view of a lamp-apparatus in accordance with the present invention with the adjustable parallelogram linkage in rectangular orientation, and including representations of directions, distances, weights, and centers of gravity as employed in the torque equations of this invention;

FIGURE 2 is an illustration similar to FIGURE 1, with the adjustable parallelogram disposed in an arbitrary oblique position;

FIGURE 3 is a perspective view of an adjustable weight-balanced lamp-apparatus in accordance with the present invention;

FIGURE 4 is a partial perspective view of the lower portion of a lamp-apparatus in accordance with the present invention and illustrating an alternative weight configuration;

FIGURE 5 is a partial perspective view of an alternative radiation device configuration suitable for use with the lamp-apparatus of FIGURE 3;

FIGURE 6 is a sectional view through the supporting joint of the unit of FIGURE 3 and illustrating the "stop knob" structure;

FIGURE 7 is an end elevational view of the lower portion of the lamp-apparatus of FIGURE 3 and illustrating the preferred location of the total center of gravity $CG_{TOT}$;

FIGURE 8 is an elevational view of the equivalent equistable body as achieved by the total lamp-apparatus of this invention; and FIGURES 9, 10 and 11 are line illustrations of extreme adjusted positions of the lamp-apparatus wherein complete neutral equilibrium of the movable balanced system is yet fully attained.

The present invention provides a parallelogram linkage with a radiation device upon an extension of one arm thereof, a balancing weight upon an extension of an intersecting arm, and a support point at the parallelogram joint diagonally opposite the joint of the two arms carrying the radiation device and weight. Particular relationships herein provide for complete or neutral equilibrium balancing of the entire movable system at any angular position thereof, and in this respect, reference is first made to FIGURE 1 of the drawing, wherein the legends employed in these relationships are set forth. As shown in FIGURE 1, the parallelogram has four joints, A, B, C, and D, with short horizontal sides of the length $a$, and longer vertical sides of the length $b$. The parallelogram is shown in FIGURE 1 as a rectangle with reference axes $x$–$y$ intersecting at the joint A, and the parallelogram links, as well as the axes thereof, are indicated by the letters $m$, $n$, $i$, and $k$. It is considered in this system that the top parallelogram arm $k$ has a total individual weight $G_k$ and an individual center of gravity $S_k$, without considering the radiation device carried by this arm. The balancing weight has a weight $G_{BAL}$ and a center of gravity $S_{BAL}$, while the arm $i$ alone has an individual weight $G_i$ and a center of gravity $S_i$. The parallelogram arm $m$, extending upwardly from the support joint A, has a weight $G_m$ and a center of gravity $S_m$, while the radiation device has a total weight of $G_L$ and an individual center of gravity $S_L$. A $z$ axis is considered to pass perpendicularly through the plane of the figure at the intersection of the $x$ and $y$ axes. The final arm $n$ has a total weight of $G_n$ and a center of gravity $S_n$.

With the foregoing definitions, it is then possible to define two sets of conditions which must be satisfied to complete the present invention. With regard to the first set of conditions, $G_L$ and $G_k$ are so arranged that their common center of gravity does not change position with reference to the axis $k$, and also, $G_{BAL}$ and $G_i$ are likewise arranged so that their common center of gravity never changes with respect to the $i$ axis. In addition, the invention provides that the centers of gravity of the links $m$ and $n$ never change with respect to the individual axes thereof. The individual weights above need not lie on the specified axes, but the stated combined centers of gravity must be so positioned. Insofar as a single plane of illustration is concerned, the individual centers of gravity of each of the four arms and appurtenances are placed upon and maintained upon the arms themselves. Considering a three-dimensional system, these four centers of gravity may lie in different planes displaced from the plane of the drawing, but in such a manner that the vertical projections of the four centers of gravity onto that plane fall on the arms. It will be appreciated, for example, that this allows displacement of $S_i$ and $S_{BAL}$ individually from the axis of the arm, as well as displacement of the combined center of gravity from the axis of the arm. For purposes of simplicity, all centers of gravity are illustrated as lying on the arms themselves and, furthermore, only a two-dimensional system is treated. It will thus be seen that the distances $x_n$, $a$, $y_i$ $y_m$, $b$, $y_{BAL}$, $x_k$ and $x_L$ are applicable to identify the location of the centers of gravity in the rectangular coordinate system illustrated.

With regard to the second set of necessary conditions, the present invention provides for the sum of all torque moments around the support point A being equal to zero as referred to the $x$ axis, and being equal to zero as referred to the $y$ axis. This sets of conditions may be reduced to equations employing the notations of FIGURE 1 as follows:

(I) $G_L \cdot x_L + G_k \cdot x_k - G_n \cdot x_n - G_i \cdot a - G_{BAL} \cdot a = 0$
(II) $G_L \cdot b + G_k \cdot b + G_m \cdot y_m + G_i \cdot y_i - G_{BAL} \cdot y_{BAL} = 0$ By satisfying the relationships I and II, the joint A becomes a common center of gravity of the entire movable system consisting of the balancing weight, the lamp, and the parallelogram linkage in the rectangular orientation thereof as shown in FIGURE 1. In actual practice, the design of a balanced system of any particular size or weight is normally accomplished by establishing lengths and weights as desired, with the exception of $G_{BAL}$ and $y_{BAL}$, which are then calculated by Equations I and II above to make the sums of the torque moments equal to zero.

There are set forth above certain conditions which must be satisfied in accordance with the present invention in order to accomplish the objects thereof. The Equations (I) and (II) were identified in terms of a rectangular parallelogram. By satisfying both the first and second set of conditions for this rectangular orientation of the parallelogram, point A remains the common center of gravity of the whole movable system for any arbitrary angular positioning of the parallelogram linkage. This is established by referring to FIGURE 2, wherein the parallelogram is illustrated to be pivoted through an angle $\gamma$. The sum of all the torque moments around joint A, taking lever arms in the $x$ direction, is equal to $$G_L \cdot (x_L + b \cdot \sin \gamma) + G_k \cdot (x_k + b \cdot \sin \gamma) + G_m \cdot y_m \cdot \sin \gamma - G_n \cdot x_n - G_i \cdot (a - y_i \cdot \sin \gamma) - G_{BAL} \cdot (a + y_{BAL} \cdot \sin \gamma)$$

This may be reduced to:

$$G_L \cdot x_L + G_k \cdot x_k - G_n \cdot x_n - G_i \cdot a - G_{BAL} \cdot a + (G_L \cdot b + G_k \cdot b + G_m \cdot y_m + G_i \cdot y_i - G_{BAL} \cdot y_{BAL}) \sin \gamma$$

It will be noted that the first portion of this last summation is the same as the left-hand part of Equation I stated above to be equal to zero. The parenthetical portion of the foregoing summation is the same as the left-hand part of Equation II, which is stated above to be equal to zero. Consequently, the foregoing summation may be rewritten as $0 + 0 \sin \gamma$ which will be seen to be equal to zero, and thus this summation is equal to zero, as required.

Taking the sum of all the torque moments about joint A with the lever arms in the $y$ direction, there is obtained the following summation:

$$G_L \cdot b \cdot \cos \gamma + G_k \cdot b \cdot \cos \gamma + G_m \cdot y_m \cdot \cos \gamma + G_l \cdot y_l \cdot \cos \gamma - G_{BAL} \cdot y_{BAL} \cdot \cos \gamma$$

This may be rewritten as follows:

$$(G_L \cdot b + G_k \cdot b + G_m \cdot y_m + G_l \cdot y_l - G_{BAL} \cdot y_{BAL}) \cdot \cos \gamma$$

It will be seen that the last summation contains a parenthetical portion which is the same as the left-hand part of the Equation II, and, consequently, is equal to zero. Thus, the summation may be rewritten as $0 \cdot \cos \gamma$ which then is clearly equal to zero.

It will be seen to follow from the foregoing calculations that the sum of all the torque moments about the support point A is equal to zero, and that consequently this point A is the common center of gravity of the whole movable system consisting of the balancing weight, parallelogram linkage and lamp for any arbitrary angular position of the parallelogram. Consequently, whatever the position of the parallelogram, the center of gravity remains at the support point A, and thus the entire system remains in balance or neutral equilibrium about A in all positions. It is to be appreciated, however, that the common center of gravity may be displaced along the $z$ axis through point A, and still achieve the foregoing relationship. In general, slight displacements of the center of gravity along the $z$ axis only slightly reduce the stability of the entire apparatus standing upon a surface such as a table top.

It is to be particularly noted that the necessary relationships of the present invention are equally applicable to situations wherein the majority of weight occurs in the radiation device, rather than the balancing weight. Thus, the present system is highly advantageous in the adjustable positioning of very heavy devices such as reflectors, mirrors, sun ray collectors, and the like. Such heavy devices are located upon a short lever arm, while a smaller balancing weight is located upon a long lever arm.

Referring to FIGURE 3, there is shown a practical weight-balanced, adjustable lamp-apparatus 11 formed in accordance with the present invention. This apparatus 11 includes a circular base plate 12 adapted to rest upon a table top, or the like, and having an upstanding L-shaped support 13 mounted thereupon. This support amy be mounted for rotational movement relative to the base, as by means of a bolt 14 extending through the center of the base and engaging the support. A parallelogram linkage 16 is mounted at point A upon this support 13, and for the purposes of maximum stability of the whole apparatus in all directions, the plane of the parallelogram is preferably displaced a slight distance $e$ from the centerline $\mathcal{C}_{12}$ of the base 12. This may be best understood by reference to FIGURE 7 showing the location of the center of gravity $CG_e$ of the parallelogram, lamp and weight on the $z$ axis and the center of gravity $CG_E$ of the supporting element displaced a distance E on the opposite side of $\mathcal{C}_{12}$ from $CG_e$. The distances E and $e$ are chosen so that the total center of gravity $CG_{TOT}$ of the entire radiation apparatus is located at all times on $\mathcal{C}_{12}$. This assures constant stability in all directions for the entire lamp-apparatus with it freely standing on a surface such as a table top. The constant stability of the whole lamp-apparatus is illustrated in FIGURE 7 by the shadowed triangle having a base $T/2$ (one-half the diameter T of base 12) and a height H. The total weight of the entire adjustable balanced system including linkage, lamp and weight is point balanced at $CG_e$ and with the total weight of the support located at $CG_E$, the total weight of the whole lamp-apparatus is centered at $CG_{TOT}$ on the centerline $\mathcal{C}_{12}$ at the apex of the triangle. Unless $CG_{TOT}$ is located on $\mathcal{C}_{12}$ at all times, the lamp-apparatus has positions of minimum and maximum stability that may differ by about 15 percent. In accordance with the teachings of the present invention, there is attained the equivalent of an equistable body such as shown in FIGURE 8, regardless of the adjusted position of the parallelogram linkage. The generally vertical arms 17 and 18 of the parallelogram are formed of lightweight square tubing, and the upper extended arm 19 is formed as an inverted U-shaped channel fitting over the tops of the arms 17 and 18 and pivotally pinned thereto at pivot points B and C. The bottom length of the parallelogram is shown to be formed of a pair of plates 21, pivotally conected to the joints A and D of the parallelogram. The balancing weight 22 is secured to the depending end of the arm 17 and may, for example, comprise a housing containing batteries or transformers. At the outer end of the upper arm 19 there is mounted a movable lamp system 23. As shown, the lamp system includes a forked bracket 24 mounted to swivel about the $k$ axis at the end of the arm or link 19, and pivotally attached to a lamp hood 26 on the axis O—O. Within the hood 26 there is provided a lamp socket into which a conventional light bulb is adapted to be threaded, and an on-off switch 27 may be provided atop the hood. The forked bracket 24 engages the lamp hood at the center of gravity $S_l$ of the lamp system 23, so that this element of the overall balanced system is always in equilibrium about its mounting axis. The forked bracket 24 acts as a universal joint.

Electrical connection to the lamp system 23 may be provided by a conductor 28 passing through the center of the base 12 and up the support bracket 13 into the parallelogram link 18. This conductor then passes through the top link 19 and preferably splits into two lines with one extending along each side of the bracket 24 into the lamp hood. Of course, a wide variety of different lamps may be adjustably mounted in accordance with the present invention, and there is illustrated in FIGURE 5 an alternative lamp configuration. One advantageous lamp structure is ring-shaped, as indicated at 31, with central transverse plates 32 engaging a ball 33 at the end of a tubular hook arm 34. This hook arm extends from the end of the parallelogram link 19 and the center of the ball 33 is disposed at the center of gravity of the lamp unit. The electrical conductor 28 extends through the arm 34 and splits into single lines 28' upon leaving the ball 33, as shown.

For certain applications, it is desirable to alternatively form the balancing weight of the apparatus hereof. FIGURE 4 shows a hooked balancing weight 41 which is attached to the parallelogram link 17 and depends therefrom to extend underneath the bottom parallelogram link 21. This type of balancing weight is advantageous in circumstances wherein it is contemplated that the parallelogram will be folded into extreme positions in which the top link is pointed downwardly, for example. It is possible under these latter circumstances for a conventionally-shaped balancing weight to swing into engagement with the pivot point A, or past it. By the utilization of a generally tubular hooked balancing weight as shown, it is possible to allow parallelogram pivoting into extreme positions without interference between the weight itself and either the pivot point A or any appurtenances thereto.

The lamp-apparatus of the present invention remains in stable equilibrium for all parallelogram orientations and FIGURES 9-11 illustrate various possible adjusted positions that are yet fully stable.

It is of particular importance in a practical weight-balanced, adjustable radiation-apparatus such as described and illustrated herein, for the balanced system to remain in adjusted position. The present invention provides for complete balancing or neutral equilibrium of the entire system, consisting of linkage, lamp and weight, in whatever position it may be placed. Because of this complete balancing, only a very slight effort or force to overcome a small inertial resistance is required to readjust the position of the balanced system, and this is, of course, quite advantageous in practical utilization thereof. It is, however, necessary to guard against inadvertent movement of the apparatus, and the present invention provides for a locking or "freezing" of the balanced system in any adjusted position. This freezing is herein accomplished by the provision of a "stop-knob" 51 located at the support point A of the parallelogram linkage. Details of the structure of this stop-knob 51 are shown in FIGURE 6. Referring to this figure, it will be seen that there is shown in part the parallelogram link 18 through which extends the bolt 52 forming the pivot joint A. On each side of this link 18 there may be provided stiffening plates 53 through which the bolt also extends. The support bracket 13 is also pierced by the bolt 52, which has a nut 54 threaded on one end thereof, and which is pinned to this support so as to lock these elements together. A spacer 56 separates the support 13 from the link plate 21. On the other side of the link 18, the knob 51 is coaxially threaded upon the bolt 52 against a spring 57 separated from the other link plate 21 by another spacer 58. Spacers 56 and 58 are secured against rotation by pins 59 extending laterally from the bolt 52 and fitting in longitudinal grooves 60 in the spacers. In this manner the spacers are free to move axially of the bolt 52 but cannot rotate around the bolt. This movement is particularly important to prevent spacer 58 from possibly rotating the knob 51 by the link 21, to thus unintentionally tighten or loosen the "stop knob." In order to prevent undesirable play in the joint A, the axial movement thereof should be minimized, and thus the spring 57 is made quite stiff as by forming the spring of a circular piece of spring metal with alternate tabs or leaves bent in opposite directions, and by forming a fine thread on the end of the bolt 52. With the joint structure illustrated in FIGURE 6, the entire parallelogram linkage may be instantly locked in position by a quick twist of the knob 51 to thus freeze the oblique position of the parallelogram itself and to lock it against the support 13.

The present invention is particularly directed to fully stabilized adjustable radiation-apparatus, so that it is not necessary for the apparatus to be physically mounted, as by screws or bolts, to fixed structures. It is not, however, intended to indicate that the present invention cannot be so mounted if desired. In such instances, the vertical $\mathcal{C}_{12}$ axis about which the entire assembly may swivel can be located outside the plane of the parallelogram, and the $\mathcal{C}_{12}$ axis need not intersect the z axis. In such a situation, offset mounting means including a clamped pivotal connection may be employed to join the support A of the parallelogram linkage with a fixed standard, and yet all of the necessary relationships of the present invention fully satisfy. Additionally, the support upon which the parallelogram is mounted at one joint thereof, may itself be placed on a long vertical stand instead of a base plate if it is desired for the overall apparatus to rest on the floor, for example. It is also possible to provide wheels on the base if desired. However, it is preferable to provide the base with an adequate diameter to preclude inadvertent tipping during rolling movement of the apparatus. It is to be particularly noted that the present invention is not only balanced in the constant field of the earth's acceleration, but also in any constant or changing acceleration field whatsoever that may be superposed upon or outside of the earth's acceleration. Thus the present invention may be advantageously employed in submarines, ships, land vehicles, aircraft and space vehicles. The balanced system is always in neutral equilibrium, and thus maintains its acquired position no matter what accelerations the support body experiences.

There have been described above particular preferred embodiments of the invention, however it is not intended to limit the invention by the terms of the description or the details of the illustration. Reference is made to the following claims for a precise delineation of the true scope of the invention.

What is claimed is:

1. Adjustable radiation apparatus comprising a parallelogram linkage with the links thereof pivotally connected, a radiation device mounted on an extension of a first link, a balance weight mounted on an extension of a second link pivotally connected to the first link, and mounting means pivotally supporting the whole linkage at a joint oppositely across the parallelogram from the joint connecting the first and second links, the center of gravity of each link and attachment lying on the link axis or displaced laterally thereof in alignment with the link axis with the displacement being parallel to the mounting pivot axis, and each one of the two sums of all weight-torque moments about the axis of the supporting joint having the levers thereof taken with reference to two arbitrary directions through the supporting joint being equal to zero.

2. Apparatus as set forth in claim 1, further defined by a threaded shaft extending through the mounting means and through the links intersecting at the supporting joint to form the pivotal mounting, and a spring-loaded knob threaded upon said shaft for locking and unlocking the supporting joint of the parallelogram and thereby freezing the linkage as to its own position and also as to the position of the entire linkage with reference to the supporting mounting means.

3. Apparatus as set forth in claim 1, further defined by the radiation device being mounted at the center of gravity thereof upon said first link and angularly movable in two arbitrary planes about said center of gravity.

4. Apparatus as set forth in claim 1, further defined by said balancing weight having an arcuate configuration curving under the parallelogram linkage to preclude interference between the weight itself and either the support joint or any appurtenances thereon.

5. Lamp-apparatus comprising first and second links pivotally connected at adjoining ends, third and fourth links pivotally connected at adjoining ends and pivotally connected to said first and second links to form a parallelogram with the first and second links extending therefrom, the four pivoting axes being parallel, a radiation device mounted upon the extended portion of said first link, a balance weight pivotally mounted on the extended portion of said second link, and a support system pivotally mounting said parallelogram at the connection of said third and fourth links, the center of gravity of each link and attachment lying on the link axis or displaced laterally thereof in alignment with the link axis with the displacement being parallel to the mounting pivot axis and each one of the two sums of all weight torque moments about the connection of said third and fourth links having the levers of the moments taken around the axis of the pivoting connection and as referred to perpendicular axes through the axis of the pivoting connection of the third and fourth links and parallel to the plane of the parallelogram being equal to zero for invariable neutral weight equilibrium.

6. Apparatus as set forth in claim 5, further defined by a shaft extending through the intersecting links and the support system at the joint of the third and fourth links for pivotally supporting the linkage, and a spring-loaded knob threaded on said shaft for locking and unlocking the supporting joint in any adjusted parallelogram position and thereby freezing the linkage as to its own position and also as to the position of the entire linkage with reference to the support system.

7. Lamp-apparatus as set forth in claim 5, further defined by said support system having a foot with a base adapted to rest upon a surface, said foot having a center of gravity laterally displaced from a vertical centerline of the base, and said parallelogram linkage and attachments having a center of gravity laterally displaced from the centerline of the base oppositely to the displacement of the center of gravity of the foot to place the total center of gravity of the lamp-apparatus on the centerline of the base for maximized stability.

8. In a weight-balanced lamp apparatus, including a parallelogram-linkage with the links thereof pivotally connected, the four pivoting axes being parallel, the lamp mounted on an extension of a first link, the balancing weight mounted on an extension of a second link pivotally connected to the first link, and support means pivotally mounting the whole system composed of linkage, lamp and balancing weight at a joint diagonally across the parallelogram and opposite to the joint connecting said first and second links; the improvement comprising the center of gravity of each unit of link and attachment to the said link laying on the axis of the link or perpendicularly to the parallelogram plane in alignment with the link axis, and each one of the two sums of all weight-torque moments about the supporting joint having the levers of the said weight-torque moments taken around the axis of said supporting joint and with reference to two arbitrary non-parallel reference axes through the axis of the supporting joint and parallel to the plane of the parallelogram being equal to zero.

References Cited
UNITED STATES PATENTS

| | | | |
|---|---|---|---|
| 703,742 | 7/1902 | Salmond | 248—294 |
| 1,564,886 | 12/1925 | O'Neil | 248—292 |
| 2,076,446 | 4/1937 | Carwardine | 248—280 |
| 2,532,173 | 11/1950 | Lewis | 248—413 |
| 3,219,303 | 11/1965 | Stryker | 248—280 |

FOREIGN PATENTS

| | | |
|---|---|---|
| 285,045 | 5/1929 | Great Britain. |
| 586,345 | 12/1958 | Italy. |

ROY D. FRAZIER, *Primary Examiner.*

J. F. FOSS, *Assistant Examiner.*